Dec. 20, 1932.  A. A. THOMAS  1,891,738
TALKING MOVIE.
Filed March 20, 1928   2 Sheets-Sheet 1
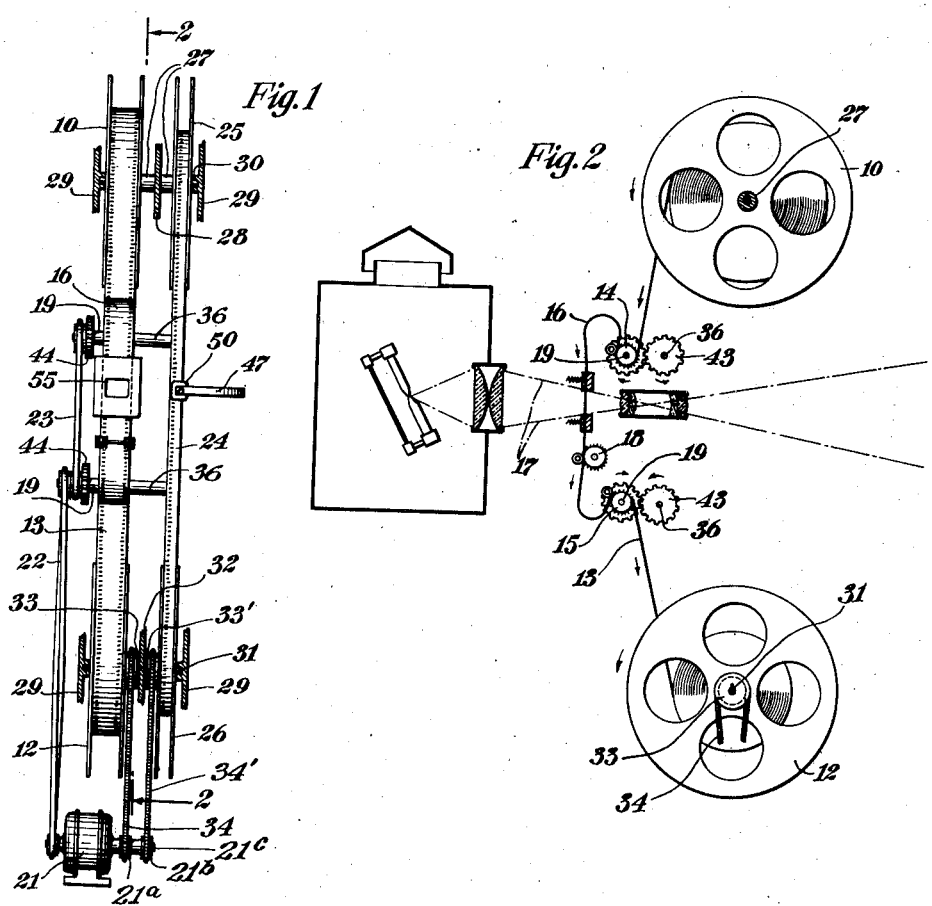
INVENTOR
Adolph A. Thomas Dec. 20, 1932.  A. A. THOMAS  1,891,738
TALKING MOVIE
Filed March 20, 1928  2 Sheets-Sheet 2
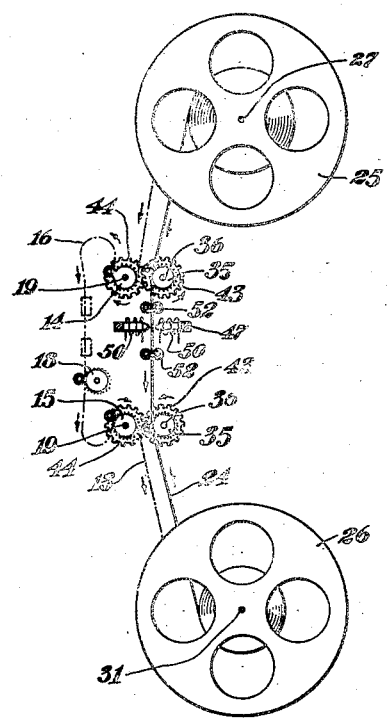
Fig. 6
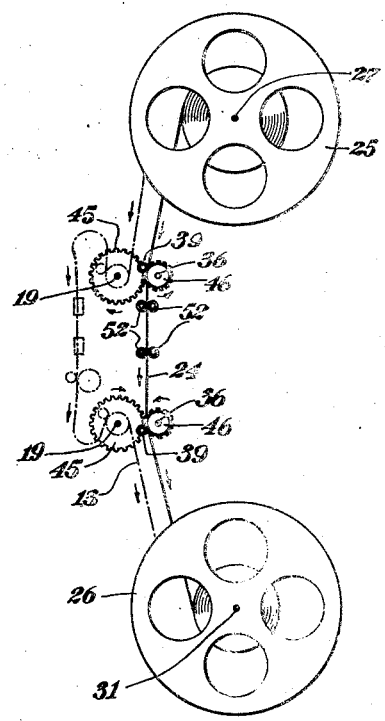
Fig. 7
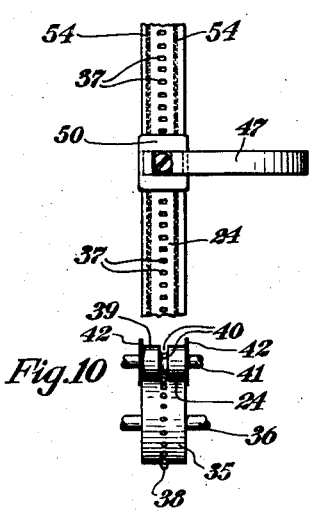
Fig. 8
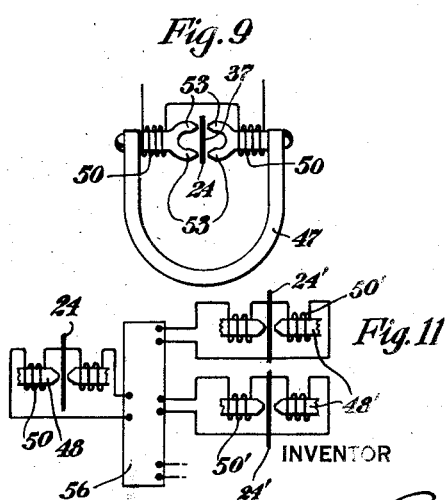
Fig. 9
Fig. 10
Fig. 11
INVENTOR
Adolph A. Thomas Patented Dec. 20, 1932

1,891,738

UNITED STATES PATENT OFFICE

ADOLPH A. THOMAS, OF NEW YORK, N. Y.

TALKING MOVIE

Application filed March 20, 1928. Serial No. 263,088.

This invention belongs to the art of so-called talking movies, in which the exhibition of motion picture films is accompanied by a reproduction of sound intelligently related to the subject matter of the film. The object of my invention is to provide novel and simplified methods and apparatus for recording sound in synchronism with the photographing operation of a movie camera, and also for reproducing the recorded sound in synchronism with the projection of the photographed picture. As will appear later, my invention is so simple in construction and operation that it lends itself particularly for use in the home and other places where complicated and expensive apparatus is out of the question.

In talking movies heretofore produced, only two methods have been to my knowledge employed to obtain synchronism between film and sound: In the first method, the sound is electrically recorded on, and later reproduced from, a phonograph record, synchronously with the feeding of the film in the camera and in the projector. According to the other method, the sound is photographically recorded along one edge of the film itself at the time the picture is made.

While both of these prior forms of talking movies are to some extent commercially practical, they contain inherent disadvantages and objectionable features. In the phonographic method first mentioned, the mechanism for driving the phonograph record in correctly timed relation to the camera and projector is not only complicated but occupies considerable space. As it often requires more than one record to accompany a long film, it is necessary to provide special apparatus of an elaborate nature for automatically switching from one record to the next at the proper moment. Then, too, phonograph records soon wear out and need frequent renewal.

In the second or optical method above referred to, while sound and picture are self-synchronizing because recorded on the same strip of film, there is the objection that the space required for the recording of sound considerably reduces the available width of the standard movie film. In some cases this reduction may be as much as eight or ten per cent. Another drawback inherent in this optical method of producing combined sound and picture films lies in the fact that the photographic emulsion of the film soon exhibits signs of wear, particularly if the emulsion is of course granular structure as in high-speed negatives. In a picture it is possible to tolerate a so-called "rainy" or streaky film, but in a film bearing a sound record, the slightest defects in the photographic surface appear as distortions and objectionable noises in the final reproduction. Furthermore, it requires complicated apparatus for transforming sound waves into light waves to record the original sound and reversing this process to reproduce the recorded sound.

The foregoing and other objections and disadvantages in prior talking movies are overcome by the method and apparatus of my present invention, both in the recording of sound and in the reproduction thereof in correctly timed relation to a moving picture. The characteristic feature of my invention in its preferred form is a thin tape or ribbon of magnetic steel adapted to be wound on and off a reel like a movie film and in synchronism therewith. This magnetic tape or ribbon is self-supporting in that it requires no backing of other material, and it is handled in the same way as a motion picture film. In employing a magnetic tape of that kind, I make use of a principle of magnetism known for many years (at least, twenty-five)—namely, that a steel body retains localized magnetic impressions. If, for example, the pole of a magnet is drawn in contact over a sheet of magnetic steel, the latter becomes permanently magnetized at only those points where it was touched by the magnet. If a steel sheet or similar magnetic body is subjected locally to magnetic flux of varying intensity, the sheet will retain these local magnetizations at the impressed intensities. This phenomenon, as I said before, has been known to scientists for a great many years, and I utilize it in producing a talking movie in which sound is magnetically recorded on a steel tape and is reproduced from the recorded tape in synchronism with a moving picture film.

According to one embodiment of my invention, a tape or ribbon of magnetic steel is wound on a reel like a movie film and loaded in the camera or projector in the same way. The film reel and the tape reel are mounted for simultaneous operation at the same speed or at the same relative speeds. The camera and the projector contain electromagnetic mechanism having pole pieces between which the steel tape is guided at predetermined speed. This mechanism is controlled by current impulses representing the sound (speech, song, music, etc.) to be recorded, and the resultant variable magnetic flux across the pole pieces magnetizes the moving steel tape along an invisible line or trail of permanent magnetic impressions which constitute a record of the original sound. Since the photographic film and the magnetic recording tape are paid out simultaneously at the same speed or at the same relative speeds, the sound is recorded in automatic synchronism with the action of the picture without the need of synchronizing apparatus. Conversely, when the positive film and the magnetized steel tape are subsequently mounted on pay-out reels in a projector, the loudspeaker mechanism operated by the tape reproduces the recorded sound in automatic synchronism with the exhibited film.

Another practical advantage of my invention resides in the fact that the sound need not be recorded simultaneously with the picture. For example, if it is desired to record music as an accompaniment to the action of a finished picture, a projector is loaded with reels carrying a positive print of the exposed film and an equal (or equivalent) length of unmagnetized steel tape. In operating the machine, the film and the tape are simultaneously paid out at the same speed, or at different speeds in fixed relation to each other. The picture is thrown on a screen in the transmitting room where the band or orchestra is situated. As the picture is exhibited, the appropriate music is played and is recorded on the steel tape in correctly timed relation to the story as it unfolds on the screen in full view of the conductor. The magnetized tape may then be used for the reproduction of the recorded music in synchronism with the film.

If duplicates of a magnetized tape are desired, as to accompany duplicate prints of a particular film, a simple way is to use the original tape as a transmitter and one or more blank tapes as magnetic receivers. I shall go into this duplication process more fully later on.

The magnetic tape of my invention is provided with sprocket holes to insure positive and uniform feeding. The holes may be of the same size and spacing as the sprocket holes in a standard movie film, and they may be arranged either in two rows along the edges of the tape (as in the film) or in a single row along one edge or at the center. The steel tape or ribbon is preferably so dimensioned in width and thickness that it possesses about the same degree of elasticity or resilience as the standard type of film, so that the two can be handled with equal ease.

In order to explain my invention so that those skilled in the art may understand and practise the same, I shall describe in detail certain simple embodiments diagrammatically illustrated by way of example in the accompanying drawings, in which—

Fig. 1 represents a simplified front view of a motion picture projector containing a reproducing steel tape operated in synchronism with the picture film;

Fig. 2 is a side view on section line 2—2 of Fig. 1;

Fig. 3 shows corresponding portions of a picture film and a recorded steel tape in approximately full size;

Fig. 4 is a plan view, partly in section, to show how the perforated steel tape is held in alignment on a flanged roller and fed by means of a sprocket wheel;

Fig. 5 is a diagrammatic plan view indicating how the steel tape passes between the poles of a magnet;

Fig. 6 represents (mainly in a diagrammatic way) a side elevation of a movie camera or projector showing how the steel tape and film are fed through the machine at the same speed;

Fig. 7 is a view similar to Fig. 6 illustrating a driving arrangement for operating the steel tape at twice the speed of the film;

Fig. 8 shows a modified form of steel tape having a central line of perforations and adapted to receive sound records along the two edges;

Fig. 9 is a diagrammatic plan view of Fig. 8;

Fig. 10 illustrates how the tape of Fig. 8 is guided and fed between a roller and sprocket arrangement; and Fig. 11 is a simplified diagram illustrating a method of producing duplicate recorded tapes.

Before taking up a detailed description of the drawings, I want to explain that I have purposely made them semi-diagrammatic for simplicity and clearness. In Figs. 1, 2, 6 and 7, only such parts of a projector (or movie camera) have been shown as are necessary to an understanding of the operation of the invention. Furthermore, the relative proportions of various parts have been intentionally exaggerated to promote clearness in the drawings.

Referring to Figs. 1 and 2, a pair of reels 10 and 12 support a photographic film 13. The upper reel 10 is the pay-out or feed reel, and 12 is the take-up reel. As is usual in motion picture cameras and projectors, the film 13 passes around a pair of sprockets 14 and 15 for feeding the film forward at a predetermined rate of speed. The feed sprockets 14 and 15 hold the film looped at 16 to allow intermittent movement of the film across the operating field 17 by means of a sprocket 18, as will be understood by those familiar with this art. The operating field 17 represents diagrammatically the light that acts on the film, whether in a projector (as shown) or in a camera. The sprockets 14 and 15 are mounted on a pair of shafts 19, which are simultaneously driven at predetermined speed from any suitable source of power. In Fig. 1, I have shown an electric motor 21, which is connected to the sprocket shafts 19 by belts or chains 22 and 23. These connections, of course, are merely diagrammatic, for in the actual machine they are considerably more elaborate.

A thin steel tape or ribbon 24 is mounted on a pair of reels 25 and 26 for movement in the same direction as film 13. The reel 25 pays out the tape, and the reel 26 takes it up. In Fig. 1 I have purposely shown the steel tape 24 running directly from one reel to the other, but it is understood that suitable driving sprockets are interposed to insure uniform feeding of the tape, as will presently be explained. The pay-out reels 10 and 25 are loosely mounted on opposite ends of a shaft 27 rigidly supported at the center in a wall or bracket 28 of the machine. The feed reels 10 and 25 are simply slipped over the ends of shaft 27, on which they are held spaced by the central portion of the shaft for free rotary movement. Movable doors 29 have recessed projections 30 fitting over the ends of shaft 27 to hold the reels 10 and 25 against lateral movement.

The take-up reels 12 and 26 are mounted on opposite ends of a shaft 31 so as to rotate therewith. This shaft is supported at the center by a partition or bracket 32, which in the actual machine may be part of the wall or bracket 28 supporting the upper shaft 27. The driving shaft 31 carries a pair of pulleys 33 and 33' connected to the motor 21 by belts or chains 34 and 34' respectively, which are driven by gears or pulleys 21a and 21b fixed on the motor shaft 21c. The pulleys 33 and 33' are connected to their respective reels 12 and 26 in any practical way. It goes without saying that the transmission ratios between the motor 21 and the shafts 19 and 31 are such that film 13 and steel tape 24 are fed across the operative field of the machine at the correct rate of speed. I have not attempted to indicate any mechanism for obtaining the proper driving speed from the source of power, because that is well understood by those who know something about motion picture cameras and projectors.

The positive and uniform feeding of the steel tape 24 in synchronism with the photographic film 13 is assured by sprockets 35 mounted on shafts 36, which are rotated at the proper speed. The steel tape 24 has sprocket holes 37 arranged to be engaged by the sprocket teeth 38. In Fig. 3, the sprocket holes are near one edge of the tape, while in Fig. 8 they are arranged along the center line of the tape. The teeth of the sprocket wheels are, of course, shaped and spaced to enter the holes in the tape, as will be clear from Figs. 4 and 10. The tape is held against each sprocket wheel by a roller 39 having a circumferential groove 40 arranged to receive the sprocket teeth 38 as they pass through the holes 37 of the tape. The rollers 39, which are mounted on shafts 41, may have side flanges 42 for holding the steel tape 24 against lateral movement. The sprocket shafts 36 are geared to sprocket shafts 19 in proper transmission ratio. In Fig. 6, the shafts 36 carry gears 43 in mesh with gears 44 on shafts 19. In this instance, the meshing gears 43 and 44 are of the same size, so that the tape sprockets 35 rotate at the same speed as the film sprockets 14 and 15. Consequently, the tape 24 is fed through the machine at the same linear speed as the film 13, except that the latter is fed intermittently at the looped portion 16, while the tape moves forward continuously. In Fig. 7, the sprocket shafts 36 rotate at twice the speed of the sprocket shafts 19 on account of the 2:1 transmission ratio between the gears 45 and 46. In other words, the steel tape 24 in Fig. 7 is fed twice as fast as film 13. This particular speed relation is given merely as an example and not by way of limitation of the invention. The sprocket shafts 19 and 36 are so arranged that by merely mounting properly sized gears thereon, any desired speed ratio may be obtained without changing other parts of the machine, except that the take-up reels 12 and 26 must obviously be driven by motor 21 at speeds corresponding to those of picture film 13 and sound tape 24. Thus, to operate the sound tape at twice the speed of the picture film, as above mentioned, the pulley 33' is so geared to the motor shaft as to rotate twice as fast as pulley 33. This transmission ratio is accomplished in any practical way, as by making the driving pulley 21b twice the size of pulley 21a, or making the pulley 33' of sound reel 26 half the size of the film pulley 33. It is evident when the picture film 13 and sound tape 24 are simultaneously operated at different speeds, the take-up reels 12 and 26 and their associated pulleys 33 and 33' are loose on shaft 31, like the pay-out reels 10 and 25 on shaft 30, so as to be capable of independent rotation. In other words, the take-up reels 12 and 26 are always driven at a speed or speeds necessary to wind up the film 13 and tape 24 as they are paid out by the film sprocket shafts 19 and the sound sprocket shafts 36.

As the steel tape 24 passes between the feed sprockets 35, it is subjected to the action of electromagnetic mechanism adapted to impress permanent local magnetizations in the tape in accordance with current variations in the coil of a controlling circuit. Fig. 5 indicates diagrammatically a simple form of mechanism for impressing a magnetic record on the steel tape 24. A magnet 47 suitably supported, has pole pieces 48 arranged to provide an airgap 49 through which the magnetic tape 24 passes at predetermined speed. The pole pieces 48 are preferably tapered at their adjacent ends, so as to concentrate the magnetic flux. One or more coils 50 are mounted on the magnet in such position as to produce a variable flux across the airgap 49 when current impulses pass through the coil. For brevity I shall refer to one coil only, without thereby intending to exclude the use of more than one coil. It is understood that coil 50 is connected in a suitable transmission system in which sound waves are transformed into current impulses. Such systems are well known and I need not show or describe them, particularly since they do not, in and of themselves, form part of my invention. It is enough to say that the coil 50 is adapted to receive current impulses representing sound waves or other vibrations to be recorded. As the steel tape 24 moves past the pole pieces 48, the magnetic flux across airgap 49 produces permanent magnetic impressions in the tape in accordance with the intensity of the magnetic flux passing transversely through the steel tape at any instant. As the tape moves through the airgap 49, the magnetizations impressed thereon form an invisible trail or line diagrammatically indicated at 51 in Fig. 3. The original sound waves are therefore permanently recorded in the steel tape 24 in synchronism with the action photographed on film 13. The tape 24 is guided through the magnetic airgap 49 by rollers 52, which may be flanged like the rollers 39 to prevent lateral movement of the tape. It is not necessary that the tape shall be spaced from the polar ends of the magnet, for the tape may be in physical contact with the polar tips. In Fig. 9 the magnet 47 is provided with pole pieces having forked ends to provide two pairs of oppositely arranged polar extensions 53. Consequently, the steel tape 24 will be magnetized along two parallel paths roughly indicated at 54 in Fig. 8.

The sound record made on the flexible steel tape 24 in synchronism with photographic action constitutes a permanent magnetic condition of the tape, which may be utilized to reproduce from the record thus made. The electromagnetic mechanism used in recording may also be employed to reproduce from the recorded tape. As the tape is run past the polar faces of the magnet, the permanent magnetic record 51 (or 54) produces flux variations through the coil 50, which is now supposed to be connected in a reproducing system for operating a loudspeaker. The current impulses thus generated in coil 50 are amplified to the requisite degree by means of any of the well known systems used in radio receiving circuits and electric phonographs. The magnetic pole pieces need not be on opposite sides of the tape, but may be on the same side thereof.

Although Figs. 1, 2, 6 and 7 are supposed to represent a motion picture projector, the mounting of the film and steel tape may be considered as applying to the recording of sound in a camera when the action is photographed. I have not attempted in the drawings to differentiate between a movie camera and a projector, and so I have indicated diagrammatically certain mechanism which is supposed to apply to both of those devices as regards the simultaneous feeding of the film and the magnetic tape. It is self-evident that the speed, or relative speeds, of film and tape should be the same in the recording of sound as in the reproduction thereof. In ordinary motion picture photography and projection, the film is fed at the rate of about sixteen exposures per second. In some talking movies the film is fed at the rate of twenty exposures per second, which represents about fifteen inches of film. The same rate of feeding may be applied to the steel tape 24. In some instances it may be desirable to run the tape faster than the film, depending upon the character of the sounds to be recorded. No fixed rule can be laid down for the speed at which the steel tape shall be run in relation to the film, and the best results can be obtained only by experiments well within the skill of the expert.

In Fig. 1 the magnet 47 is arranged in transverse alignment with the opening 55, through which a section of the film is exposed to the light. This alignment is not, however, necessary, for it is evident that the magnetizing poles may be arranged at any convenient point between the spools 25 and 26. The only thing to be borne in mind is that the electromagnetic mechanism of the tape shall be in the same relation to the film opening 55 in the camera as in the projector. If desired, certain marks may be made at intervals along the edge of the film and the tape to indicate points of synchronism. Such index marks would be helpful to the operator in making sure that the film and tape were in proper relation when the projector is loaded. The steel tape 24, which is smooth and of substantially uniform thickness, need not be more than one fourth of an inch wide and a few thousandths (or even ten thousandths) of an inch thick, so that it may be easily wound on and off the reel. In other words, the magnetic tape should have a flexibility that will permit its handling in about the same way as an ordinary motion picture film. For convenience I have referred to the tape 24 as of steel, but I do not use that word in its strict metallurgical sense; rather do I mean a tape made of magnetic material capable of receiving permanent local magnetizations and sufficiently flexible to be handled by means of reels. The precise dimensions of the tape can only be determined by actual experiment with different magnetic materials to obtain a tape of the right degree of flexibility. The average thickness of a standard motion picture film is about 0.0065 of an inch, and a steel tape ¼ inch wide having the same degree of flexibility as a film is considerably thinner. This permits a correspondingly greater length of tape to be wound on a reel of the same diameter as standard film reels.

It will be understood from the foregoing description that I have provided exceedingly simple means for permanently recording and reproducing sound in synchronism with photographed action. The recorded sound may be speech or song to accompany action, or it may be orchestral music for a dramatic story photographed on the film. In the first instance, the record is made simultaneously with the photographing of the action, but music accompanying the exhibition of a picture can only be rendered after the different film sections have been assembled in final form. My invention lends itself equally well to recording sound simultaneously with the action or at any later time. The magnetic record impressed in the steel tape gives superior results in loudspeaking reproduction, because of the absolute fidelity with which the sound can be recorded by this method, due principally to the absence of mechanically vibratory parts. With ordinary handling the steel tape is indestructible, magnetically as well as mechanically, so that there is no deterioration in the reproduction with continued use of the tape, as is the case with photographic film. It is evident that the steel tape can be used for recording and reproduction without the accompaniment of a photographic film. By connecting the coil 50 in a talking circuit, the operator can make a faithful permanent record of speech, music and pictures. The latter, of course, require a photo-electric cell to control the circuit of coil 50 in accordance with light variations that strike the cell. This will be understood by those skilled in the art without further explanation. The coil 50 can be connected in the output circuit of a radio receiver to record broadcast reception. Also, my new recording instrument is adapted for use at home in making a permanent record of music and voices. All that is necessary is to connect the coil 50 in a transmitting circuit and run the steel tape at proper speed.

It is a simple matter to make duplicates of a magnetized tape by running it through the electromagnetic mechanism to generate current impulses in coil 50, and simultaneously running a blank tape at the same speed through a similar electromagnetic mechanism controlled by current impulses produced by the first tape. In this way, the second tape is magnetized in exactly the same way as the first tape. In other words, the first tape acts as a transmitter and the second tape as a receiver. By this method it is possible to record a plurality of duplicating tapes from the original recorded tape in a single operation, as diagrammatically illustrated in Fig. 11, where two blank tapes 24' are driven synchronously with recorded tape 24. The outline 56 represents any suitable amplifying and transmission system between the transmitting coil 50 and the receiving coils 50' associated with steel tapes 24'. The current impulses generated in coil 50 by the magnetic record in tape 24 are transmitted simultaneously to the receiving coils 50', which so control the flux of their respective field magnets that the magnetizations impressed on the tapes 24' are duplicates of the magnetizations in tape 24. For simplicity and lack of space, I have shown only two receiving tapes 24', but the number can be multiplied within practical limits. Another way to duplicate an original recorded tape is making a phonograph record from the tape and utilizing the record to magnetize as many blank tapes as desired.

Considering my invention from a commercial aspect, its main practical advantages are simplicity of construction and operation, whereby the apparatus can be made at a low cost and sold at prices within reach of the ordinary buyers of radio sets and phonographs. Since the tape 24 and its electromagnetic mechanism occupy but little space, these parts can be inserted in a small movie camera and projector available for household and school use. Reels of blank steel tape are supplied by the same dealers who sell the film. A talking movie machine made in accordance with this invention can be used in a cabinet of about the same size as a phonograph. The projector can be mounted at the bottom of the machine, and the light is reflected against a screen at the top of the cabinet. A loudspeaker may also be arranged in the cabinet, so that the sound will appear to come from the figures in the picture. In certain aspects of my invention, the flexible tape or ribbon 24 may be of any structure or character adapted to receive a permanent sound record produced in any practical way. For example, it is evident that the novel supporting and driving mechanism for the sound tape is equally applicable to an optical sound film separate from the picture film. When I therefore speak broadly of a sound tape in certain claims, I include any tape-like or ribbon-like member adapted to receive a record of sound waves.

Although I have shown and described certain constructions, I want it clearly understood that my invention is not limited to the details set forth, for it is evident that the fundamental principles herein disclosed may be carried out in other ways without departing from the scope of the appended claims.

I claim as my invention:

1. Talking movie apparatus having a flexible sound tape wound off one reel onto another simultaneously with motion picture film, sprockets for driving said tape and other sprockets for driving said film, shafts for supporting the tape sprockets and other shafts for supporting the film sprockets, a gear connection between each tape shaft and the associated film shaft for driving the first shaft at a different rate of speed than the other shaft, and mechanism operatively associated with the moving tape to reproduce recorded sound therefrom.

2. In talking movie apparatus, a pair of pay-out reels and a pair of take-up reels, means for supporting each pair of reels in substantially axial alignment for independent movement, one pay-out reel and its associated take-up reel being adapted to support a motion picture film, the other pay-out reel and its associated take-up reel being adapted to support a sound record tape, and connections for simultaneously operating said take-up reels, said connections including sprockets for the film and other sprockets for the tape, the film sprockets being geared to the tape sprockets.

3. In talking movie apparatus, the combination of two pairs of gears mounted in spaced vertical alignment, the gears of each pair being permanently in mesh, a feed sprocket driven by each gear, one pair of vertically aligned sprockets being arranged to feed motion picture film and the other pair of vertically aligned sprockets being arranged to feed recording and reproducing tape, the gear ratio between meshing gears determining the speed or relative speed at which the film and the tape are simultaneously fed through the machine, and a power shaft for operating said gears.

4. A combined movie camera and sound recorder having means for supporting a pair of pay-out reels in substantially axial alignment for independent rotary movement, a take-up reel for each pay-out reel, one of said pay-out reels carrying motion picture film and the other pay-out reel carrying a flexible tape, means for supporting said take-up reels in substantially axial alignment, mechanism operatively associated with said tape to make permanent impressions therein in accordance with current impulses representing transmitted sound, and driving connections for simultaneously operating said reels to feed the sound tape at a higher rate of speed than the picture film, said driving connections including sprocket shafts for the picture film and other sprocket shafts for the sound tape, the last-named shafts being geared to the other shafts in increased transmission ratio.

5. A combined movie camera and sound recorder having means for supporting a pair of pay-out reels in substantially axial alignment for independent rotary movement, a take-up reel for each pay-out reel, one of said pay-out reels carrying motion picture film and the other pay-out reel carrying a flexible tape means for supporting said take-up reels in substantially axial alignment, mechanism operatively associated with said tape to make permanent impressions therein in accordance with current impulses representing transmitting sound, and means for simultaneously driving said reels to pay out the film and the tape at predetermined rate of speed, said driving means including sprocket shafts for the picture film and other sprocket shafts for the sound tape, the last named shafts being geared to the other shafts in increased transmission ratio.

6. A machine for recording sound in synchronism with photographed action, comprising means for exposing a moving strip of optical film to the action of light, electromagnetic mechanism including a coil and a magnetic airgap, means for moving a steel tape through said airgap to produce varying magnetic impressions in said tape by current impulses in said coil, a common power shaft, driving connections leading from said power shaft for simultaneously operating said film and said steel tape at the same relative speed, feeding devices positively engaging said film and said tape to insure predetermined synchronous movement of those two parts at all times, whereby sound is magnetically recorded in the steel tape in synchronism with the action photographed on the film, the tape-feeding devices being geared to the film-feeding devices in predetermined transmission ratio, and means for connecting one set of said feeding devices to said power shaft.

7. A combined movie camera and sound recorder having means for supporting a pair of pay-out reels in substantially axial alignment for independent rotary movement, a take-up reel for each pay-out reel, one of said pay-out reels carrying motion picture film and the other pay-out reel carrying a flexible tape, means for supporting said take-up reels in substantially axial alignment, mechanism operatively associated with said tape to make permanent impressions therein in accordance with current impulses representing transmitted sound, means for simultaneously driving said reels to pay out the film and the tape at predetermined rate of speed, and sprockets engaging holes in said film and tape for positively feeding these parts at a predetermined uniform rate of speed, the tape sprockets being geared to the film sprockets in predetermined transmission ratio.

8. A combined movie camera and sound recorder having means for supporting a pair of pay-out reels for independent rotary movement, a take-up reel for each pay-out reel, one of said pay-out reels carrying motion picture film and the other pay-out reel carrying a flexible record tape, mechanism operatively associated with said tape to make permanent impressions therein in accordance with current impulses representing transmitted sound, means for simultaneously driving said reels to pay out the film and the tape at predetermined rate of speed, sprockets engaging holes in said film and tape for positively feeding these parts at a predetermined uniform rate of speed, the tape sprockets being geared to the film sprockets in predetermined transmission ratio, and means for driving said sprockets to feed the sound tape at a higher rate of speed than the film.

9. Apparatus for recording and reproducing sound in synchronism with photographed action, comprising a pair of pay-out reels carrying respectively a steel tape and photographic film, a take-up reel for each pay-out reel, electromagnetic mechanism including a coil and pole pieces arranged to provide a magnetic airgap, an optical system operatively associated with said film for producing images thereon or projecting images therefrom, means separate from said reels for guiding said steel tape through said airgap past said pole pieces, so that current impulses in said coil produce varying magnetic impressions in said steel tape and vice versa, connections for driving said reels to pay out the tape and the film simultaneously at the same relative speed, feeding devices positively engaging said tape and film to insure synchronous movement of those two parts at all times, and a common power shaft for operating said driving connections and said feeding devices, the tape-feeding devices being geared to the film-feeding devices in predetermined transmission ratio.

10. In talking movie apparatus, the combination of a fixed shaft supported at the center, a pair of pay-out reels mounted on the opposite ends of said shaft for independent simultaneous rotation, one of said reels carrying a motion picture film and the other reel carrying a sound record tape in relation to the photographed action, means for holding said reels spaced on said shaft, a second shaft supported at the center, a pair of take-up reels rotatably mounted on the opposite ends of said second shaft, a pair of driving members supported on said second shaft between the two reels for simultaneously operating the latter at predetermined speed, a power shaft connected to said driving members, sprocket wheels for simultaneously feeding said film and said tape at predetermined speed across their respective fields of operation, and means for driving said sprockets from said power shaft.

11. Apparatus for reproducing sound in synchronism with photographed action, comprising a pair of pay-out reels carrying respectively a steel tape and photographic film, a take-up reel for each pay-out reel, electromagnetic mechanism including a coil and pole pieces arranged to provide a magnetic airgap, an optical system operatively associated with said film for projecting images therefrom, means separate from said reels for guiding said steel tape through said airgap past said pole pieces, and connections for driving said reels to pay out the tape and the film simultaneously at the same relative speed, whereby sound is magnetically reproduced from said steel tape in synchronism with the action projected from said film, said driving connections including sprocket wheels arranged to enter holes in said tape and film respectively for positively feeding these movable strips at a predetermined rate, so that said synchronism is automatically maintained at all times.

12. In talking movie apparatus, the combination of a pair of spaced shafts, means for supporting said shafts at the center in substantially parallel relation, a pair of reels detachably mounted on the ends of each shaft, two corresponding reels of said pairs being adapted to support a motion picture film and the other two corresponding reels being adapted to support a sound record tape, means whereby the two reels that support the picture film rotate independently of the other two reels that support the sound tape, a rotary power shaft, driving connections between said power shaft and the take-up reel of the picture film, and separate driving connections between said power shaft and the take-up reel of the sound tape.

13. In cinematographic apparatus, the combination of a pair of shafts supported in spaced parallel relation, a plurality of feed reels mounted on one of said shafts side by side for independent rotation, a corresponding plurality of take-up reels mounted side by side on the other shaft for independent rotation, each pair of corresponding reels being adapted to support an operative tape-like member for winding off one reel on to the other, a sprocket device for driving one of said members, another sprocket device for driving the other member, a power shaft connected to said sprocket devices for simultaneously operating them at different rotational speeds, and connections between said power shaft and take-up reels for operating the latter at speeds corresponding to the speeds of said sprocket devices.

14. A combined movie camera and sound recorder having two pairs of reels for operatively supporting a motion picture film and a separate sound tape, a sprocket wheel for engaging the film, a second sprocket wheel for engaging the sound tape, means for mounting said sprocket wheels for independent rotation, a rotary power shaft, a driving connection between said power shaft and said first sprocket for moving the film at a certain linear speed, a separate driving connection between said power shaft and the second sprocket for moving the sound tape at a different linear speed from that of the film, and driving connections between said power shaft and the two take-up reels for simultaneously rotating the latter at different speeds corresponding to the respective speeds of said sprockets.

15. In talking movie apparatus, the combination of a shaft supported substantially at the center, a pair of reels carried by said shaft on opposite sides of its supported center, means whereby said reels are mounted on said shaft for independent rotation, a second pair of reels supported in operative relation to said first pair of reels, one corresponding pair of said reels constituting a feed reel and a take-up reel for supporting a motion picture film, the other pair of said reels constituting a feed reel and a take-up reel for supporting a sound record tape, a power shaft, driving connections between said power shaft and the take-up reel of the picture film, and other driving connections between said power shaft and the take-up reel of the sound tape.

16. Talking picture apparatus comprising a pair of reels for supporting a motion picture film, a second pair of reels for supporting a magnetic sound-recording ribbon, means whereby said pairs of reels are rotatable independently of each other, a rotary power shaft, driving connections between said power shaft and said film reels, other driving connections between said power shaft and said sound ribbon reels, and a magnetic recording or reproducing device mounted in operative relation to said ribbon.

17. Talking picture apparatus comprising a pair of reels for supporting a motion picture film, a second pair of reels for supporting a magnetic sound-recording ribbon, means whereby said pairs of reels are rotatable independently of each other, a rotary power shaft, driving connections between said power shaft and said film reels, other driving connections between said power shaft and said sound ribbon reels, and a magnetic recording or reproducing device mounted in operative relation to said ribbon, said device including an electromagnet having a pole piece and a coil on each side of the magnetic ribbon, said two opposed pole pieces being separated by an airgap through which the sound ribbon is fed.

ADOLPH A. THOMAS.